United States Patent [19]

Cocksedge

[11] 4,059,789
[45] Nov. 22, 1977

[54] PHASE-SENSITIVE TRANSDUCER APPARATUS WITH SIGNAL OFFSET MEANS

[75] Inventor: Kenneth W. Cocksedge, Pleasanton, Calif.

[73] Assignee: Xerox Corporation, Stamford, Conn.

[21] Appl. No.: 670,463

[22] Filed: Mar. 25, 1976

[51] Int. Cl.$^2$ .............................................. G05B 1/01
[52] U.S. Cl. .................................... 318/608; 318/632; 318/657; 364/840
[58] Field of Search .............. 318/608, 657, 632, 572; 235/151.11

[56] References Cited

U.S. PATENT DOCUMENTS

| | | | |
|---|---|---|---|
| 3,191,010 | 6/1965 | Tripp et al. | 235/155 |
| 3,541,320 | 11/1970 | Beall | 235/183 |
| 3,601,676 | 8/1971 | Halfhill | 318/632 X |
| 3,774,115 | 11/1973 | Greiner | 328/36 |
| 3,839,665 | 10/1974 | Gabor | 318/608 |
| 3,932,741 | 1/1976 | Hanson | 235/197 |
| 3,939,389 | 2/1976 | Nopper | 318/657 |

*Primary Examiner*—B. Dobeck
*Attorney, Agent, or Firm*—M. J. Colitz; T. J. Anderson; B. P. Smith

[57] ABSTRACT

A phase-sensitive transducer apparatus comprises first and second relatively movable members, the first relatively movable member having a plurality of windings and the second relatively movable member having a winding. Means are included for applying a first input signal to one of the windings of the first relatively movable member and a second input signal to another of the windings of the first relatively movable member, an output signal being induced on the winding of the second relatively movable member. The first and second input signals are sinusoidal in nature of substantially identical frequency and peak amplitude and are phase-displaced by a predetermined amount, and the output signal is substantially constant in peak amplitude and variable in phase during relative movement of the first and second relatively movable members. The apparatus further comprises means coupled to the winding of the second relatively movable member for squaring the output signal, means coupled to the means for squaring for demodulating the squared output signal to derive a pulse signal of constant peak amplitude and variable pulse width as the first and second relatively movable members are moved relative to one another, means coupled to the means for demodulating for integrating the phase signal to derive a position signal indicative of the relative movement of the first and second relatively rotatable members, the position signal alternating during such relative movement substantially between a supply voltage and a reference voltage, and means coupled to the means for integrating for offsetting the position signal so that it is substantially balanced about the reference voltage.

6 Claims, 10 Drawing Figures

PHASE-SENSITIVE TRANSDUCER APPARATUS WITH SIGNAL OFFSET MEANS

BACKGROUND OF THE INVENTION

This invention relates to transducer apparatus and, more particularly, to a phase-sensitive transducer apparatus of the type comprising first and second relatively movable members wherein the first relatively by movable member has a plurality of windings and the second relatively movable member has a winding, and means for applying a first input signal to one of the windings of the first relatively movable member and a second input signal to another of the windings of the first relatively movable member, an output signal being developed, as by induction, on the winding of the second relatively movable member. In this type of transducer apparatus, the first and second input signals are generally sinusoidal in nature of substantially identical frequency and peak amplitude and are phase-displaced by a predetermined amount, and the output signal is substantially constant in peak amplitude and variable in phase during relative movement of the first and second relatively movable members.

Phase-sensitive transducer apparatus of the above type have been used in systems where it is desired to sence and record and/or control movement of a movable element. This is generally accomplished by kinematically coupling the second relatively movable member, above defined, to the movable element in order that they are able to move in synchronism. The first relatively movable member remains fixed and thus may be considered a stator and the second relatively movable member may be considered a rotor. The output signal from the rotor winding is phase-modulated in the sense that its peak amplitude remains constant and its phase changes during movement of the rotor relative to the stator. Then, by appropriately demodulating the output signal, a position signal may be derived which is periodic in nature in response to rotor movement wherein each new period of the signal is indicative of movement of the rotor and thus corresponding movement of the movable element.

U.S. Pat. No. 3,191,010 discloses a phase-sensitive transducer apparatus of the above-described type as used in a position measuring system. The stator of the transducer apparatus is shown with a pair of windings, which respectively receive a pair of sinusoidal signals of substantially identical peak amplitude and frequency, but phase-displaced by 90°. The output signal from the single rotor winding is then a sinusoidal signal having the same peak amplitude and frequency as each of the sinusoidal inputs to the stator, but having a phase which varies as a function of the position of the rotor relative to the stator.

Phase-sensitive transducer apparatus can also be used in conjunction with a servo control system to control the direction and speed of movement of a movable element. In such context, a means would be provided for deriving a position signal from the rotor output signal which alternates during movement of the rotor and thus movable element relative to the stator between a desired peak voltage level and a reference voltage level. In accordance with known procedures, the reference voltage is typically ground, or zero voltage. In many servo control systems, velocity information is derived from the position signal, as by differentiation techniques, and both velocity information and position information are used in controlling the direction and speed of movement of a movable element. An example of one such servo system is disclosed in U.S. Pat. No. 3,839,665.

If a phase-sensitive transducer apparatus were used in conjunction with a servo control system of a type which utilizes not only the position signal as generated by the apparatus in response to movement of the movable element, but also velocity information as derived from the position signal, it is clear that great care must be taken to insure the peak amplitude of the position signal remains constant. Fluctuations and variations in such peak amplitude could adversely effect the accuracy of the velocity signal and thus the accuracy of the servo control system. Additionally, any offset of the electrical signals about ground when the actual mechanical assembly is at a "zero" location will cause the servo system to be inaccurate.

In most contemporary servo systems utilizing a position signal as derived from a transducer apparatus, whether phase or amplitude sensitive, movement of the controlled movable element is generally detected by sensing "zero-crossings" of the position signal. By the term "zero-crossings" in its broader context, it is meant those portions of the position signal which cross an imaginary line half-way between the positive-going and negative-going peaks. As alluded to above, in a phase-sensitive transducer apparatus, the position signal traditionally alternates between ground or zero voltage and a positive (or negative) peak voltage, thereby making the "zero-crossings" equal to one-half the peak voltage. Consequently, it would be necessary, if a traditional phase-sensitive transducer were used in a servo control system employing "zero-crossing" detection, to carefully adjust the detection system for one-half peak voltage detection. It should be clear that any amplitude fluctuations and offset errors that occur in the position signal would make accurate "zero-crossing" detection extremely difficult, thereby leading to possible servo errors.

It would be desirable, therefore, to provide a phase-sensitive transducer apparatus for generating a position signal which is maintained balanced about a reference potential, such as ground, in order to enable more accurate "zero-crossing" detection. It would further be desirable if, in such apparatus, the position signal is maintained at a substantially constant peak amplitude.

SUMMARY OF THE INVENTION

In accordance with the invention, a phase-sensitive transducer apparatus is provided comprising first and second relatively movable members, the first relatively movable member having a plurality of windings and the second relatively movable member having a winding; means for applying a first input signal to one of the windings of the first relatively movable member and a second input signal to another of the windings of the first relatively movable member, an output signal being developed on the winding of the second relatively movable member, the first and second input signals being sinusoidal in nature of substantially identical frequency and peak amplitude and being phase-displaced by a predetermined amount, and the output signal being substantially constant in peak amplitude and variable in phase during relative movement of the first and second relatively movable members; means coupled to the winding of the second relatively movable member for squaring the output signal; means coupled to the means for squaring for demodulating the squared output signal to derive a pulse signal of constant peak amplitude and variable pulse width as the first and second relatively movable members are moved relative to one another; means coupled to the means for demodulating for integrating the pulse signal to derive a position signal indicative of the relative movement of the first and second relatively rotatable members, the position signal alternating during such relative movement between a peak voltage and a reference voltage; and means coupled to the means for integrating for offsetting the position signal so that it is substantially balanced about the reference voltage.

In accordance with the preferred embodiment, the phase-sensitive transducer apparatus further comprises a source of supply voltage and first means for coupling the supply voltage to the output of the means for demodulating whereby the peak amplitude of the pulse signal is maintained substantially constant at the supply voltage. Additionally, the means for offsetting preferably comprises means coupled to the means for integrating for amplifying and position signal, and a second means for coupling the supply voltage to the means for amplifying whereby the position signal at the output of the means for amplifying will be at the reference voltage when the position signal at the input of the means for amplifying is at a level equal to one-half of the supply voltage.

These and other aspects and advantages of the present invention will be more completely described below with reference to the accompanying drawings.

DESCRIPTION OF THE PREFERRED EMBODIMENT

Figure 1:
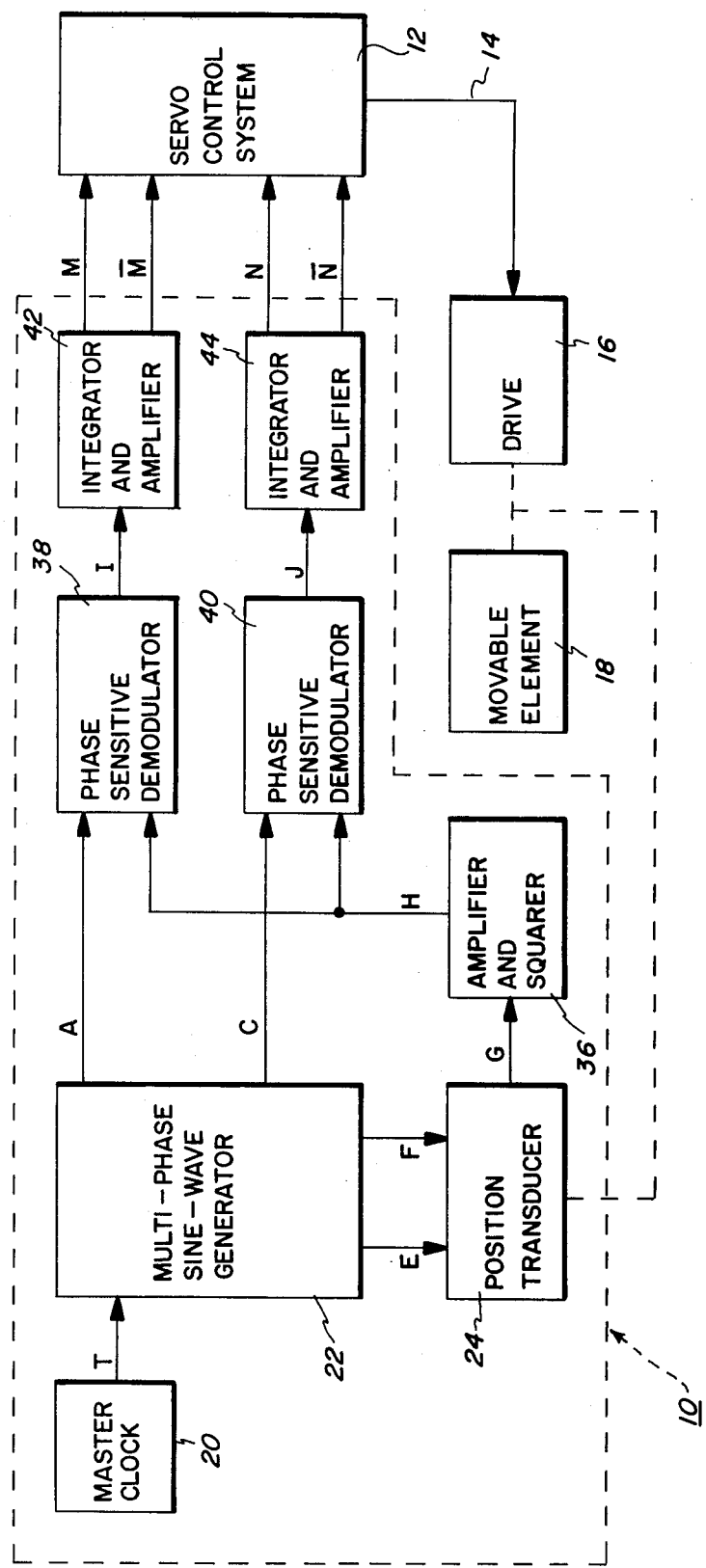
FIG. 1 is a general block diagram representation of a phase-sensitive transducer apparatus of the present invention as used in conjunction with a servo control system to control the positioning of a movable element.

Referring to FIG. 1, a phase-sensitive transducer apparatus 10 is shown for generating a plurality of position signals M, $\overline{M}$, N and $\overline{N}$, each representative of the positional movement of a movable element 18. The position signals may be used in or with any suitable apparatus or system requiring as an input a signal or signals representative of the positional movement of the movable element 18. For example, and as shown in FIG. 1, the position signals M, $\overline{M}$, N and $\overline{N}$ may be coupled to a servo control system 12 which operates upon the position signals to generate an error signal on an output line 14 to control a drive assembly 16, which may include a drive motor and associated driver circuits (both not shown) for driving the movable element 18.

The servo control system 12 may be of any suitable type having the need for any one or more of the position signals as inputs thereto. An example of a servo control system which would operate upon all four position signals is disclosed in U.S. Pat. No. 3,839,665. As shown in that patent, an exemplary movable element to be controlled may include the head carriage of a disk drive device. It is clear, however, that the movable element 18 could be any element capable of controlled movement along a prescribed path. Other examples are a rotatable print wheel and a print carriage of the type employed in a serial printer, such as disclosed in U.S. application Ser. No. 505,105 filed on Sept. 11, 1974 by Andrew Gabor for HIGH SPEED PRINTER WITH INTERMITTENT PRINT WHEEL AND CARRIAGE MOVEMENT and assigned to the assignee of the present invention.

Referring now specifically to FIGS. 1 and 7-10, the phase-sensitive transducer apparatus 10 comprises a master oscillator or clock 20 capable of generating a high frequency clock signal T of a desired frequency and peak amplitude +V3. In accordance with a presently preferred embodiment, the signal T may have a frequency of about 2MHz and a peak amplitude of about +5 volts d-c. The +5 volt level may be generated from a suitable 5 volt d-c power supply (not shown). The clock signal T is coupled to a multi-phase sine-wave generator 22 which generates, in a manner to be described in more detail below in connection with FIGS. 2 and 3, a pair of phase-displaced sinusoidal signals E and F. These signals are of substantially identical frequency and peak amplitude +V5 and are desirably phase-displaced by 90°. In accordance with the preferred embodiment, the frequency of signals E and F is about one-eighth that of clock signal T. Thus, if clock T is about 2MHz, then signals E and F are about 250 KHz.

As will become clear below, the generation of only two sinusoidal signals E and F, preferably phase-displaced by 90°, is merely exemplary in view of the intended use of these signals. There could be more than two mutually phase-displaced sinusoidal signals generated, if that were required. Again, the manner in which this could be accomplished will be described in more detail below.

The two phase-displaced sinusoidal signals E and F are forwarded to a position transducer 24 which operates upon these signals to generate an output signal G which is substantially constant in peak amplitude (+V6), but variable in phase during movement of the movable element 18. The variable phase relationship is shown diagramatically in FIG. 8 by signals G(a) – G(d) which represent what the phase relationship of signal G would be at various spaced positions of the movable element 18 corresponding to 45° phase shifts in the signal G. The use of 45° phase shifts is, of course, merely exemplary.

Figure 3:
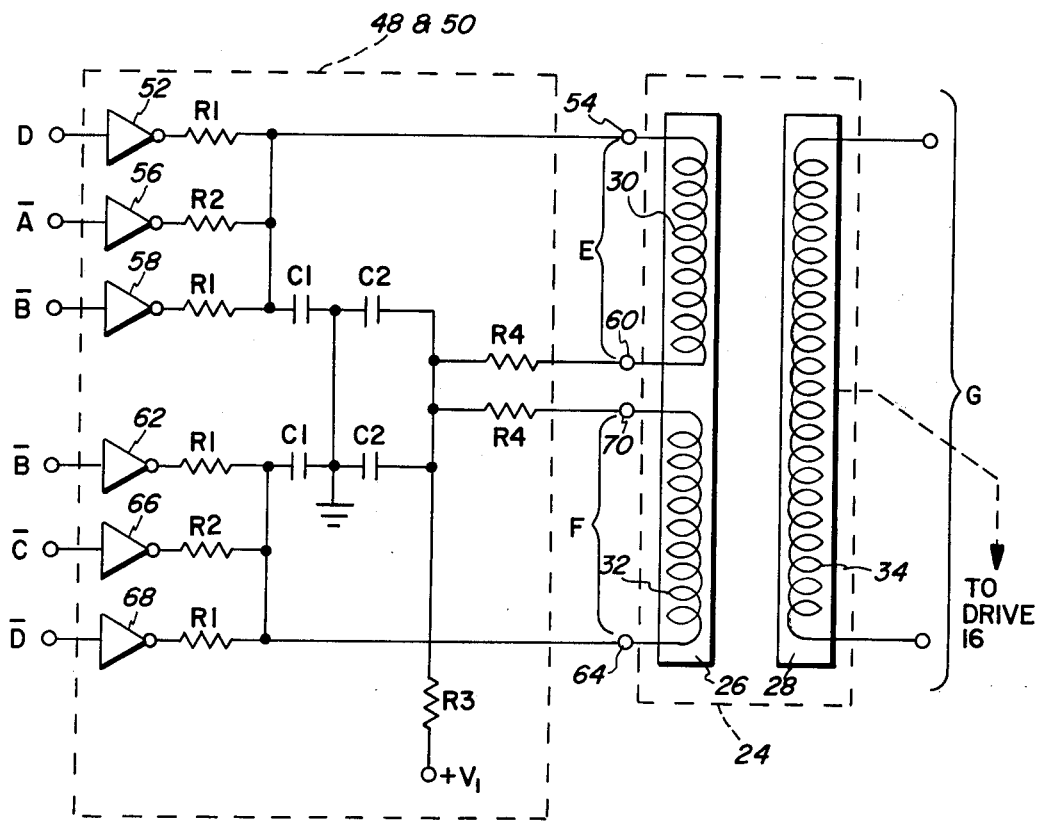
FIG. 3 is a schematic circuit diagram of preferred current drivers as shown in FIG. 2 and a preferred position transducer as shown in FIG. 1.

Referring for a moment to FIG. 3, a preferred position transducer 24 includes a pair of relatively movable members, such as a stator 26 and a rotor 28 wherein the stator is fixed in position by suitable means (not shown) and the rotor is kinematically coupled by suitable means, such as a shaft (not shown), to drive 16 for rotation synchronously with movement of the movable element 18. The stator 26 comprises a plurality of windings, preferably two windings 30 and 32, and the rotor has a winding 34. The signals E and F developed by the generator 22 are respectively coupled to the stator windings 30 and 32 and the signal G is developed from the rotor winding. Rotation of the rotor relative to the stator corresponds to movement of the movable element 18 and causes the constant amplitude variable phase signal G to be developed. The spatial relationship of the windings 30 and 32 relative to the winding 34 determines the phase of the signal G, as is conventional and as more completely described in the U.S. Pat. No. 3,191,010.

The signal G from the transducer 24 is coupled to an amplifier and squarer circuit 36 which will be described in more detail below in connection with FIG. 4. At this time, however, it should be noted that circuit 36 converts the signal G to a square-wave signal H. As used herein, the term "square-wave" shall be deemed to include both square and rectangular waveforms. It will be noted in FIG. 8 that signal H, like signal G, has a constant amplitude and is variable in phase during movement of the movable element 18 and thus rotation of the rotor 28 relative to the stator 26. Again, such variation in phase is shown diagramatically by showing what the phase relationship of signal H is at each of 8, 45° phase-shifted positions. As with signal G, signal H would be of constant phase if the movable element 18, and thus the rotor 28, were stationary.

As indicated previously, the servo control system 12 is preferably of a type requiring as inputs the four position signals M, $\overline{M}$, N and $\overline{N}$. To this end, the signal H is coupled to one input of each of two substantially identical phase-sensitive demodulators 38 and 40. As will be described in more detail below in connection with FIGS. 5 and 6, the demodulators 38 and 40 respectively compare the signal H as against a pair of signals A and C as developed by the sine-wave generator 22 and which will be described in more detail below in connection with FIGS. 2 and 7. In response to such comparison, the demodulators 38 and 40 respectively generate signal I and J which may be characterized as 90° phase-displaced pulse signals having the same constant peak amplitude, but a variable "mark-space ratio", or variable pulse width. The true signals I and J generated during rotation of the rotor 28 are not shown, but rather, like signals G and H, they are shown at various stages of rotor rotation corresponding to rotor positions defining 45° phase-shifts in the signals G and H. The variance in pulse width will be noted as the rotor is rotated. Should the rotor 28 and thus movable element 18 be fixed, the signals I and J would be 90° phase displaced, but having the same pulse-width, or "mark-space ratio", which pulse-width would be determined entirely by the spatial relationship between the stator windings 30 and 32 and the rotor winding 34.

The signals I and J are respectively coupled to a pair of integrator and amplifier circuits 42 and 44 which are desirably substantially identical and which integrate and amplify the signals I and J to derive the position signals M and $\overline{M}$ (from signal I) and N and $\overline{N}$ (from signal J). The specific manner by which this is accomplished and the nature of the position signals M, $\overline{M}$, N and $\overline{N}$ will be more completely described below in connection with FIGS. 5 and 10. At this point, however, it will be noted that the position signals may have a triangular waveform in response to movement of the movable element 18 wherein each positive and/or negative peak, or every one or every other zero-crossing can be used to detect progressive movement of the movable element 18.

Figure 2:
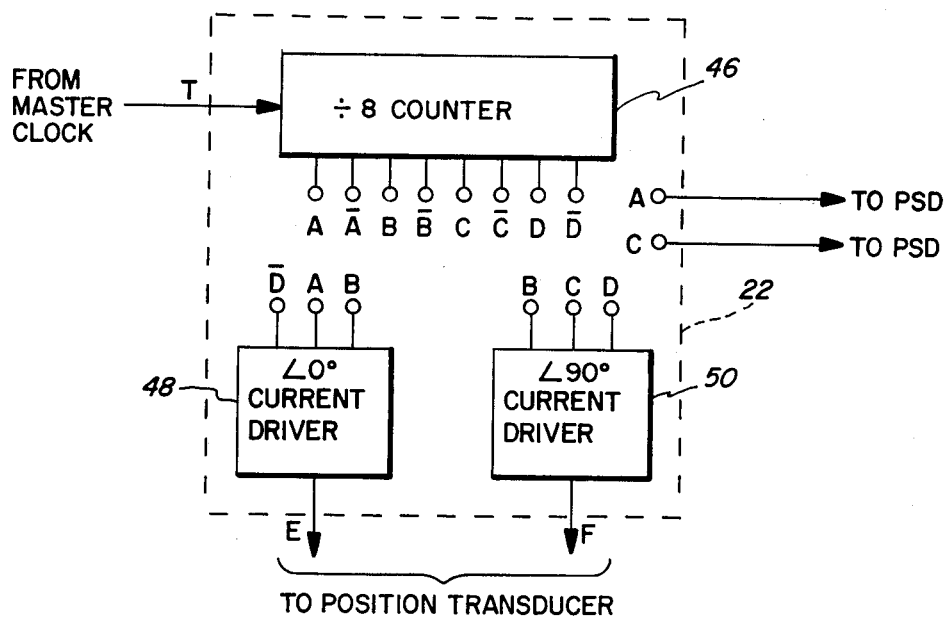
FIG. 2 is a general block diagram representation of a preferred multi-phase sine-wave generator as shown in FIG. 1.

Referring now to FIG. 2, the multi-phase sine-wave generator 22 preferably comprises a conventional "divide-by-eight" counter 46 which is responsive to the master clock signal T for generating a plurality of mutually phase-displaced square-wave signals A, $\overline{A}$, B, $\overline{B}$, C, $\overline{C}$, D, and $\overline{D}$, each having a frequency substantially equal to one-eighth that of clock signal T and each having a peak amplitude substantially equal to that of signal T, i.e. +V3. This relationship is shown more clearly in FIG. 7 wherein signal B is phase-displaced 45° (⅛ of 360°) forwardly of signal A, signal C 45° forwardly of signal B, and so on.

In order to form the two 90° phase-displaced sinusoidal signals E and F for application to the position transducer 24, a pair of current drivers 48 and 50 are respectively employed. As will be described in more detail below, current driver 48 includes means for combining a first group of the eight square-wave signals generated by the counter 46, e.g. D, $\overline{A}$ and $\overline{B}$ in order to synthesize a constant current sinusoidal waveform D·A·B from which the signal E is derived. Likewise, the current driver 50 preferably includes means for combining a second group of the counter output signals, e.g. $\overline{B}$, $\overline{C}$ and $\overline{D}$ in order to synthesize a constant current sinusoidal waveform B·C·D from which the signal F is derived.

Referring to FIG. 3, the current driver 48 preferably includes a first inverter 52 having its input connected to the signal D terminal of the counter 46 and its output coupled through a first resistor R1 to one terminal 54 of the stator winding 30. A second inverter 56 has its input connected to the signal $\overline{A}$ terminal of the counter 46 and its output coupled through a second resistor R2 to the terminal 54. Additionally, a third inverter 58 has its input connected to the signal $\overline{B}$ terminal of the counter 46 and its output coupled through a third resistor R1, identical to the first resistor R1, to the terminal. The outputs of the three resistors R1 and R2 are also coupled through a smoothing capacitor C1 to ground. Additionally, a source of d-c voltage, +V1, is coupled through a pair of series connected resistors R3 and R4 to a second terminal 60 of the stator winding 30 and through the resistor R3 and a series connected capacitor C2 to ground.

Figure 7:
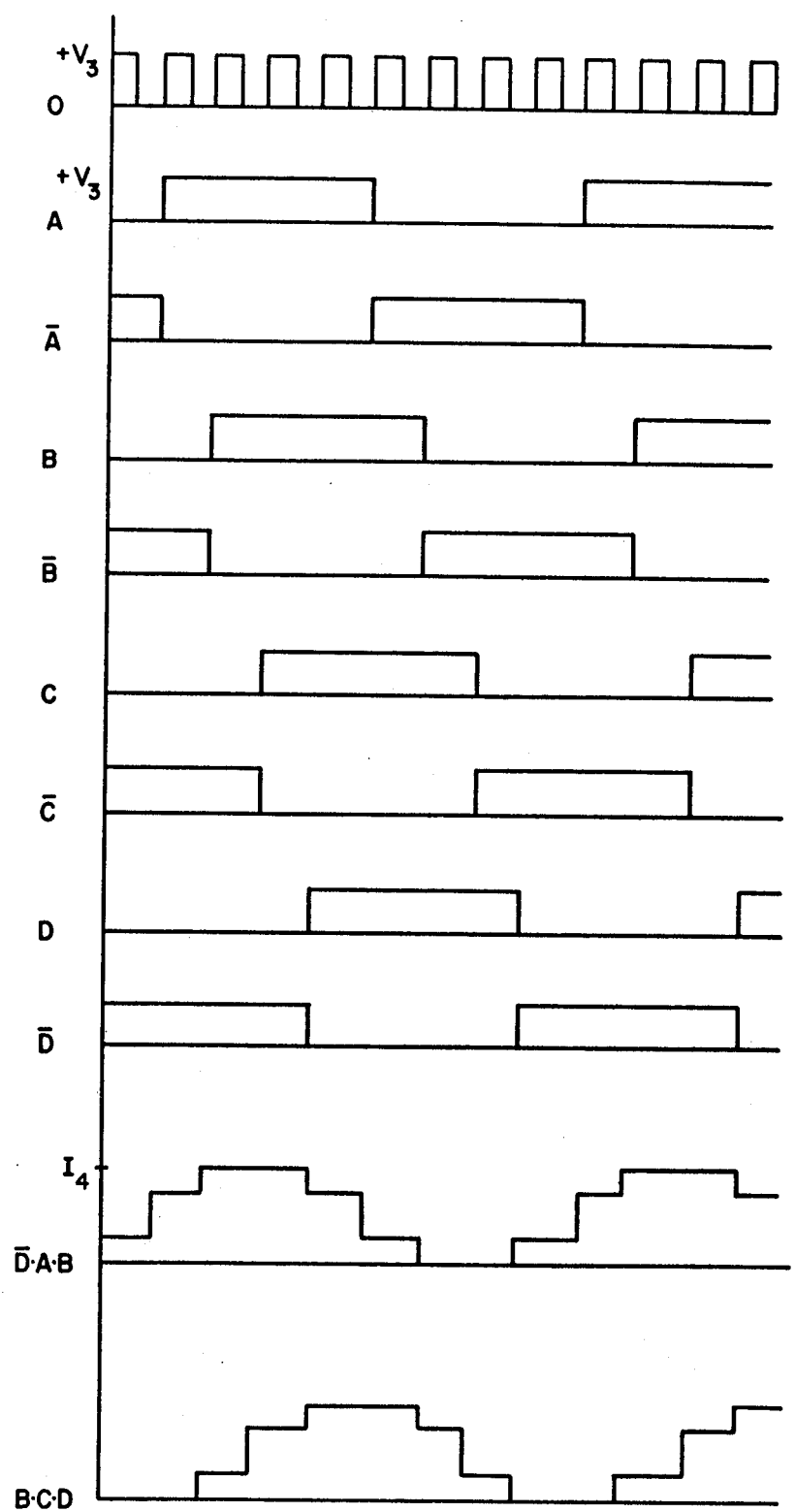
FIGS. 7 – 10 are electrical waveforms of various signals present in the system and circuits of FIGS. 1 – 6.
Figure 8:
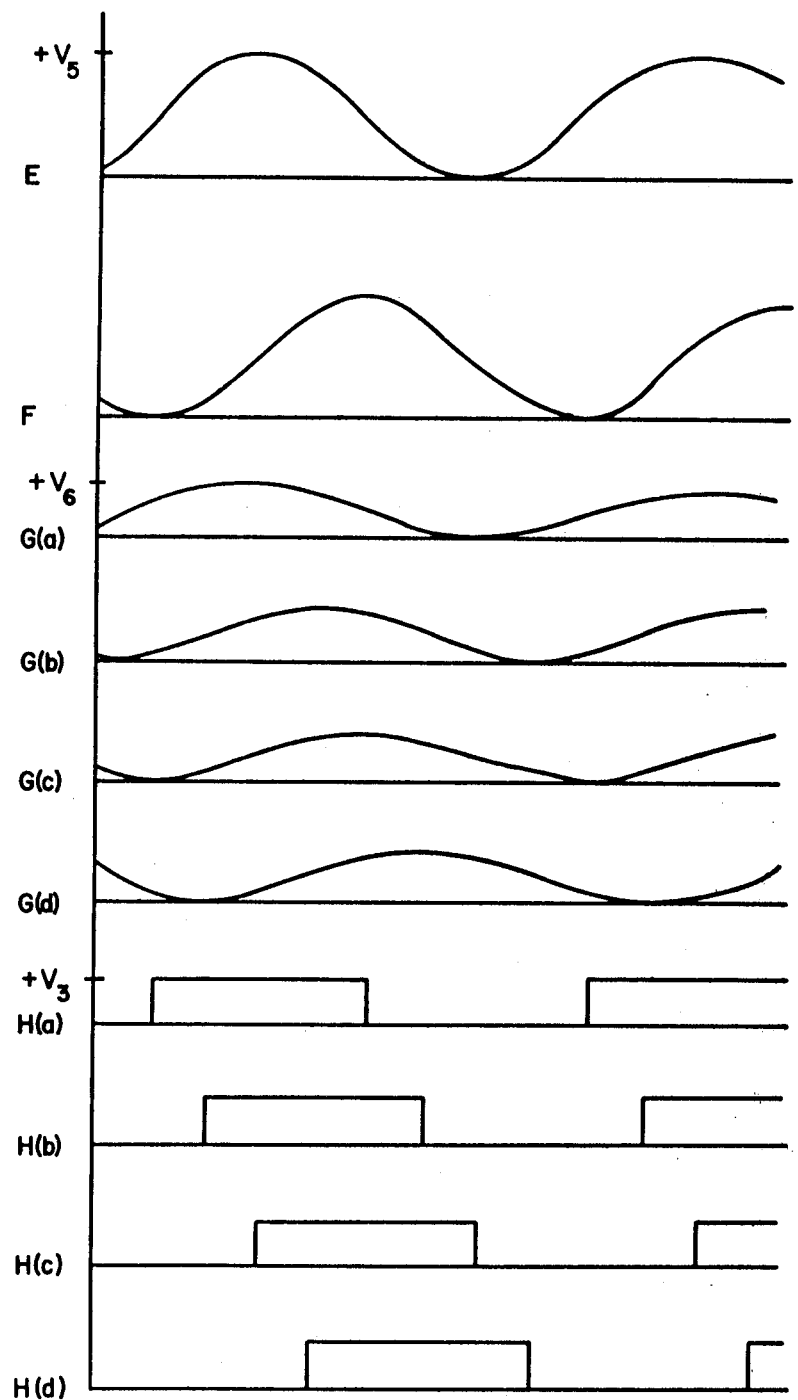

In view of the above relationship, a composite current waveform, $\overline{D}$·A·B, is formed at the joined outputs of the three resistors R1 and R2. As shown in FIG. 7, the signal $\overline{D}$·A·B has three steps, a first formed at the positive going edge of signal $\overline{D}$, a second at the positive going edge of signal A and a third at the positive going edge of signal B. The first and third steps are preferably approximately one-half the amplitude of the second step. This is made possible by using a resistor R2 having a resistance approximately one-half that of each of the two resistors R1. The composite signal $\overline{D}$·A·B is "smoothed-out" by the capacitor C1 in order to define a realistic sine-wave, i.e. signal E, having an amplitude of +V5 as determined in part by the source voltage +V1, as coupled through the resistors R3 and R4 to the terminal 60 of the stator winding 30.

The current driver 50, like current driver 48, includes a first inverter 62 having its input connected to the signal $\overline{B}$ terminal of the counter 46 and its output connected through a first resistor R1, identical in value to the resistors R1 of driver 48, to one terminal 64 of the stator winding 32. A second inverter 66 has its input connected to the signal $\overline{C}$ terminal of the counter 46 and its output coupled through a second resistor R2, identical in value to the resistor R2 of driver 48, to the terminal 64. Additionally, a third inverter 68 has its input connected to the signal $\overline{D}$ terminal and its output coupled to the terminal 64 through another resistor R1. As with the driver 48, the outputs of the three resistors R1 and R2 of the driver 50 are also coupled to ground through a capacitor C1 identical to the capacitor C1 of driver 48. Further, the voltage source, +V1, is coupled through the resistor R3 and a second resistor R4 to a second terminal 70 of the stator winding 32.

A composite signal B·C·D will then be formed at the joined outputs of the resistors R1 and R2 of driver 50. As shown in FIG. 7, this signal is identical in frequency and amplitude to the composite signal $\overline{D}$·A·B, but is phase-displaced from it by 90°. Likewise, the signal F, derived from the signal $\overline{D}$·A·B by smoothing it with the capacitor C2 and bringing it up to the desired amplitude +V5, is phase-displaced 90° from the signal E (see FIG. 8).

It is an aspect of the preferred embodiment that the current flowing in each of the stator windings 30 and 32 be substantially constant in peak amplitude notwithstanding possible minor variation in the resistance of each such winding. This is made possible by using the current drives 48 and 50 which are essentially constant current sources. More specifically, the values of the resistors R1 and R2 are each chosen to be substantially greater than the resistance of each of the resistors R3 and R4, as well as the resistance of each of the windings 30 and 32 (see TABLE OF EXEMPLARY VALUES, supra). In this manner, minor differences in resistance of the windings 30 and 32 will not affect to any significant degree the current flowing therein, as respectively determined by the composite signals D·A·B and B·C·D.

Figure 4:
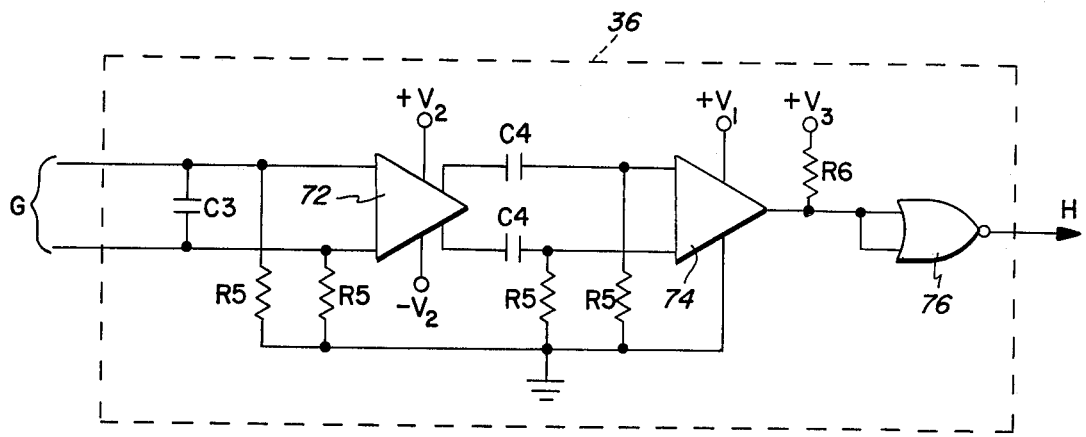
FIG. 4 is a schematic circuit diagram of a preferred amplifier and squarer circuit as shown in FIG. 1.

Reference is now had to FIG. 4 where a preferred amplifier and squarer circuit 36 will be described. As shown, the circuit 36 comprises an operational amplifier 72 having a pair of input terminals across which are coupled a capacitor C3 and to which the signal G from the rotor winding 34 is applied (see FIGS. 3 and 8). The input terminals are each coupled through a resistor R5 to ground. The resistors R5 are desirably identical in value. The amplifier 72 also includes a pair of bias terminals to which source voltages +V2 and −V2 are respectively applied. These voltages may be derived from any suitable d-c power supply or source (not shown). The amplifier 72 also includes two output terminals each coupled through a separate capacitor C4 to a respective one of two input terminals of a second operational amplifier 74. The capacitors C4 are preferably indentical in value.

The two inputs of the amplifier 74 are each coupled through a resistor R5 to ground, all of the resistors R5 being substantially identical in value. A pair of bias terminals of the amplifier 74 are respectively coupled to the source voltage +V1 and to ground. A single output terminal is coupled through an inverter 76 with the output from the inverter being the signal H discussed previously in connection with FIG. 1 and shown in FIG. 8. A source voltage +V3 is also coupled to the output of the amplifier 74 in order to raise the peak amplitude of the signal H substantially to the level of the voltage +V3.

In operation, the signal G from the rotor winding 34 is applied across the capacitor C3 and the input terminals to amplifier 72. The amplifier 72 amplifies the signal and then applies it through the coupling capacitors C4 to the input terminals of the amplifier 74. The latter amplifier operates to both amplify and square the signal. The resultant squared and amplified signal is then inverted by the inverter 76 and forwarded as the signal H (FIG. 8) to respective inputs of the phase-sensitive demodulators 38 and 40.

Figure 5:
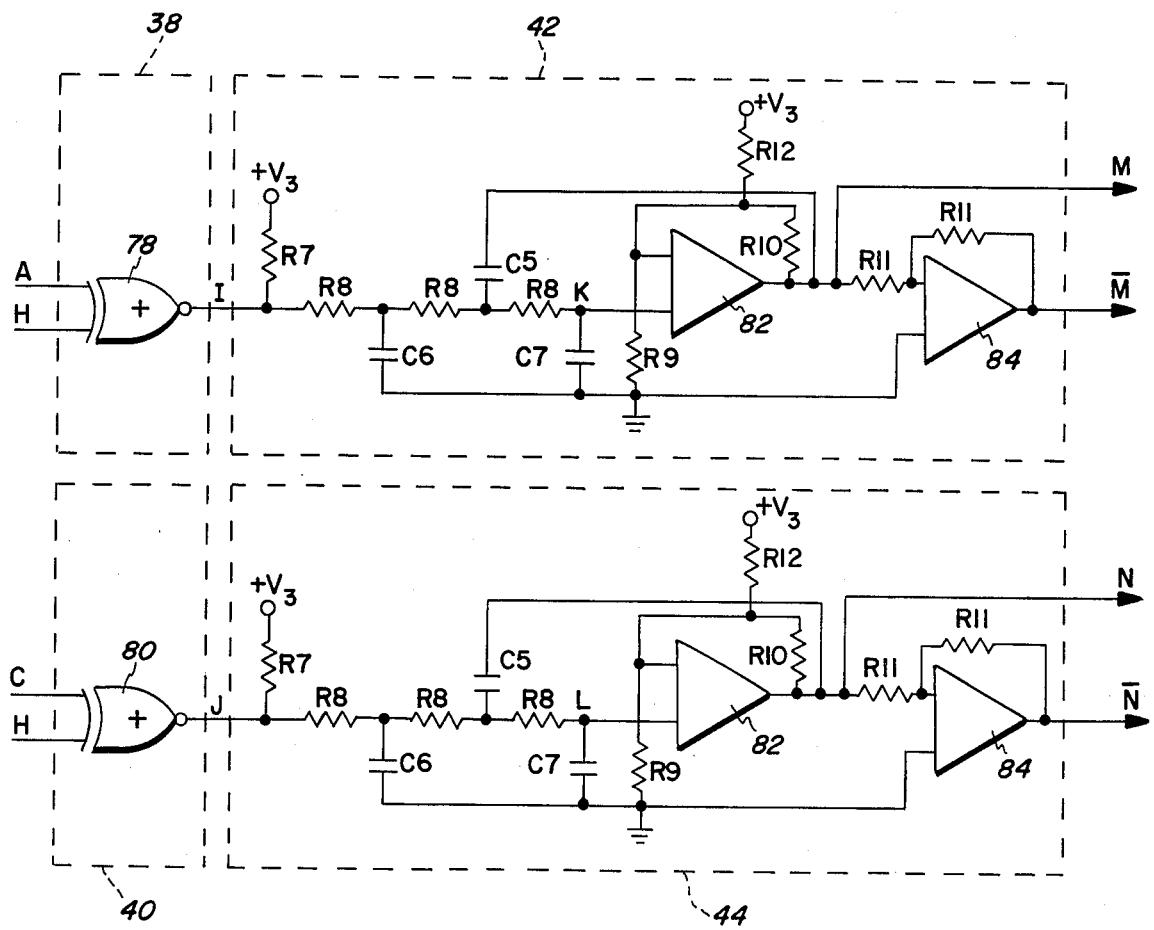
FIG. 5 is a schematic circuit diagram of preferred phase-sensitive demodulators, and preferred integrators and amplifiers as shown in FIG. 1.

Referring to FIG. 5, the demodulators 38 and 40 are each preferably comprised by an exclusive NOR-gate 78 and 80, respectively. The NOR-gate 78 has a pair of input terminals for respectively receiving the A signal from the counter 46 of generator 22 and the H signal from the inverter 76 of the amplifier and squarer circuit 36. Similarly, the NOR-gate 80 has a pair of input terminals for respectively receiving the C signal from the counter 46 and the H signal. The selection signals A and C is merely exemplary, as any two signals from the counter 46 which are phase-displaced by 90° can be used since it is desired that the position signals M and N be 90° out-of-phase. Obviously, if it were desired that signals M and N be 45° out-of-phase, two other signals having this phase relationship, such as signals A and B, could be used.

Figure 9:
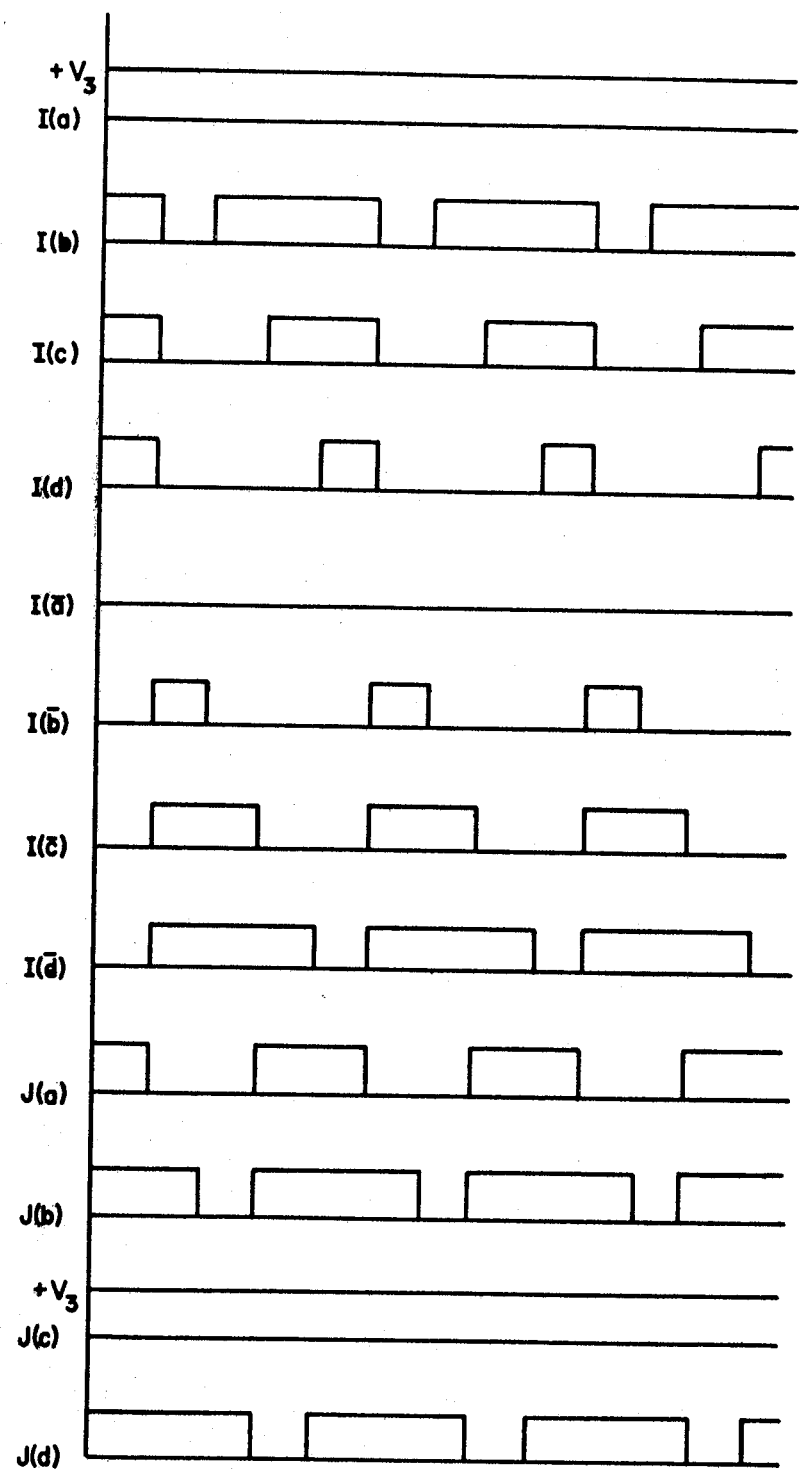
Figure 10:
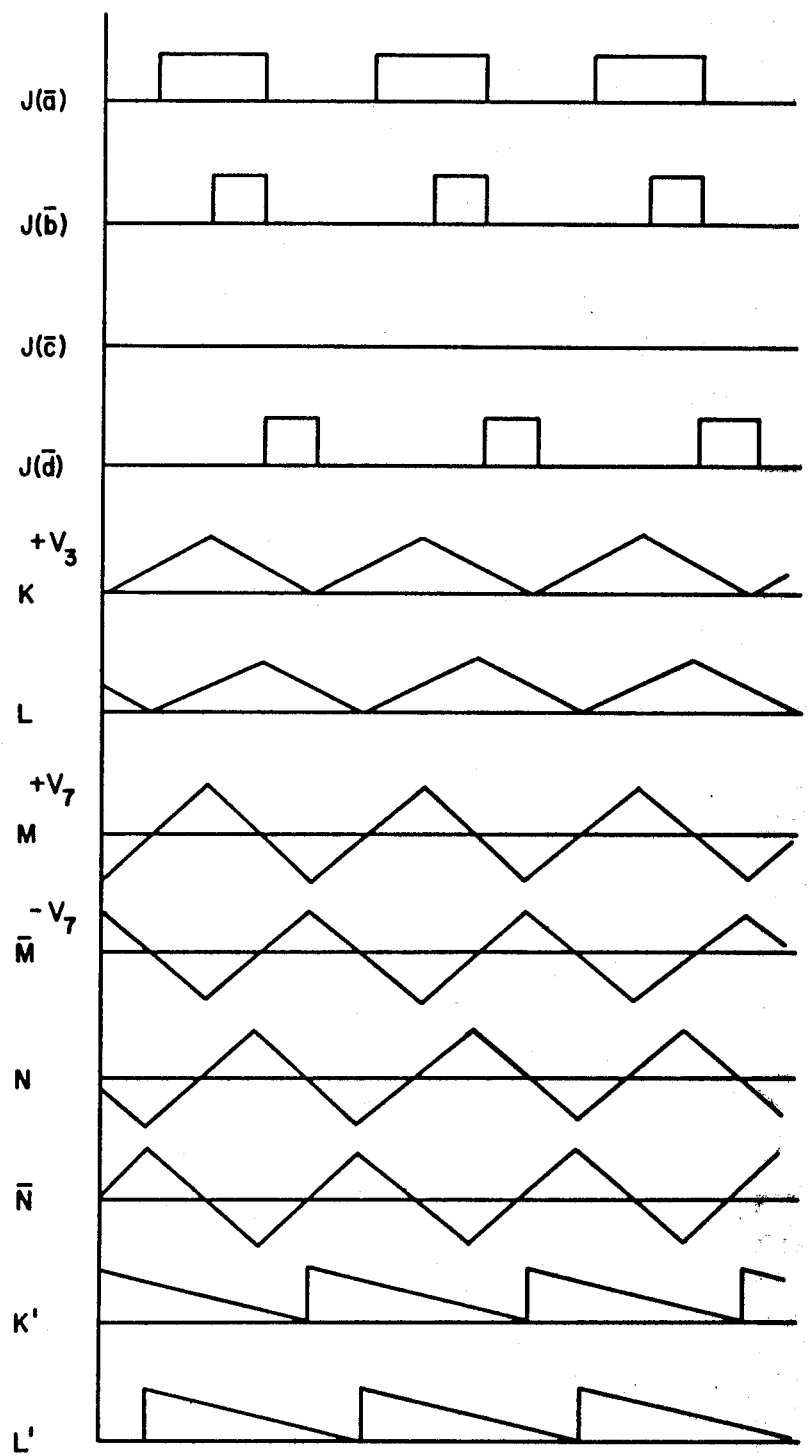

In operation, the NOR-gates 78 and 80 will each produce a high output for so long as both inputs are either high or low and a low output when the two inputs differ. The resultant output signals I and J are shown in FIGS. 9 and 10 where, as indicated earlier, that are shown by way of convenience at varying positions of the rotor winding 34 relative to the stator windings 30 and 32, which positions correspond to 45° phase displacements of the signal.

Still referring to FIG. 5, the integrator and amplifier circuits 42 and 44 are preferably identical in all respects and so only one will be described in detail. Thus, the output signal I from the exclusive NOR-gate 78 is brought substantially up in peak amplitude to the level of the source voltage +V3 as by coupling such voltage through an appropriate resistor R7 to the output of the NOR-gate. The signal I is then fed through an integrator preferably comprised of a pair of integrator stages. The first stage includes an RC circuit comprised of a first resistor R8 and a capacitor C6 coupled in series between the output of NOR-gate 78 and ground. A second resistor R8 substantially identical in value to the first resistor R8 is coupled between the junction of the first resistor R8 and capacitor C6, and a second integrator stage. More specifically, the second integrator stage preferably includes another RC circuit comprised of a third resistor R8 substantially identical in value to the other resistor R8 and a capacitor C7 coupled in series between the second resistor R8 and ground. An output signal K from the integrator portion of the circuit 42 is defined at the junction between the third resistor R8 and the capacitor C7 and is shown in FIG. 10 for movement of the rotor 28 relative to the stator 26. A corresponding signal L is derived from the integrator portion of circuit 44 coupled to the output of the NOR-gate 80. As shown in FIG. 10, it is identical in frequency and peak amplitude to the signal K, but phase-displaced 90° therefrom.

The signal K is fed to one input of the operational amplifier 82, such input being coupled to the third resistor R8 and capacitor C7, as described above. A second input of the amplifier 82 is coupled through a resistor R9 to ground, through a feedback resistor R10 from an output of the amplifier 82, and through a resistor R12 to the source voltage +V3. The output of the amplifier 82 is also preferably coupled in feedback relation through a capacitor C5 to the junction of the second and third resistors R8.

In accordance with the present invention, the application of the source voltage +V3 through the resistor R12 to the second input of the amplifier 82 acts to offset the output signal from the amplifier 82 in a manner balancing it about zero. This occurs due to the selection of the combined resistance of resistor R9 in parallel with resistor R10 to be substantially equal to the resistance of resistor R12. Further, the ratio of resistor R10 to resistors R9 and R12 in parallel sets the gain stage. In this manner, the amplitude of the signals at both inputs to the amplifier 82 will be substantially equal to one another when the signal K is at substantially one-half its peak voltage or, assuming such peak voltage to be approximately +V3, at +V3/2. When the inputs to the amplifier 82 are at the same amplitude, the output will be zero. Thus, the output signal from the amplifier 82, i.e. the position signal M, will be identical in frequency to signal K, but amplified and balanced about zero, unlike signal K (see FIG. 10).

The position signal M at the output of the amplifier 82, aside from the being applied directly to the servo control system 12 (FIG. 1), is also coupled through a first resistor R11 to a first input of an inverting amplifier 84 which has its output fedback through a second resistor R11 to the first input, the resistors R11 preferably being identical in value. A second input of the amplifier 84 is connected directly to ground. The output of the amplifier 84 is the position signal $\overline{M}$ which is also coupled to the servo control system. In a like manner, position signals N and $\overline{N}$ are respectively developed at the outputs of the amplifier 82 and amplifier 84 of the circuit 44.

It is another aspect of the present invention that the signals A - $\overline{D}$, H, I, J, K, L, and the second inputs of the amplifiers 82 are all tied to the source voltage +V3. If the power supply for voltage level +V3 is a relatively stable supply, it is clear that each of the above signals will be of substantially constant peak amplitude, thereby insuring that the position signals M, $\overline{M}$, N and $\overline{N}$ will likewise be of substantially constant peak amplitude, which is desirable for accurate servo control, especially if the servo control system includes means for deriving velocity signals from the position signals.

Figure 6:
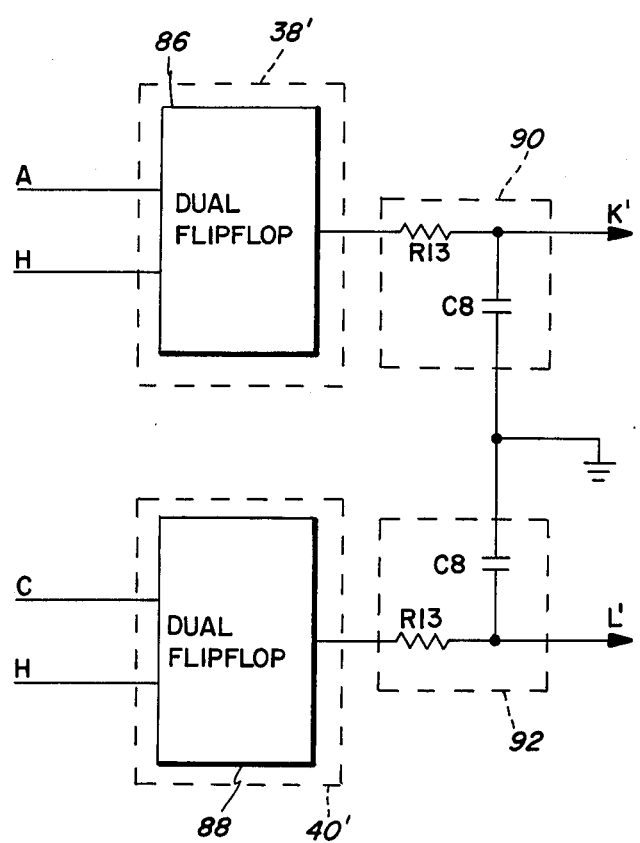
FIG. 6 is a schematic circuit diagram of alternative phase-sensitive demodulators and integrators.

Referring to FIG. 6, alternative phase-sensitive demodulators 38' and 40' are shown in the form of a pair of dual flip-flop circuits 86 and 88. Thus, the flip-flop 86 receives the A signal at one input and the H signal at another input and operates upon the time difference between the two signals to produce an output signal which, when integrated, as by an integrator circuit 90 constituted by an RC circuit R13-C8, produces a signal K' having a sawtooth wave-form (see FIG. 10). The flip-flop 88 operates upon signals C and H in a like manner to produce, when integrated by an integrator 92 identical to integrator 90, a signal L' of the same frequency and peak amplitude as the signal K', but phase-displaced therefrom by 90° (see FIG. 10). The signals K' and L' can then be amplified and balanced about zero using circuitry similar to that employed in circuits 42 and 44 of FIG. 5, as described above.

As explained earlier, it is a feature of the present invention to have the position signals M, $\overline{M}$, N and $\overline{N}$ each balanced about zero since they are to be supplied to and used in a servo control system wherein the zero-crossings of such position signals may be detected to define incremental movement of the movable element 18 (FIG. 1).

It should be clear that the values of the various circuit components and voltages depicted in the drawings and described above will vary in dependence upon the intended use. In a presently preferred embodiment used in connection with a servo control system to control the speed and direction of rotation of a rotatable print wheel, such as those employed in serial printers, the table below sets out exemplary values which have been found statisfactory.

| TABLE OF EXEMPLARY VALUES | | | |
|---|---|---|---|
| ITEM | VALUE | ITEM | VALUE |
| V1 | 15v. | R9 | 178Ω |
| V2 | 4.5v. | R10 | 113KΩ |
| V3 | 5.0v. | R11 | 86.6KΩ |
| I4 | 80.0ma. | R12 | 68KΩ |
| V5 | 0.20v. | R13 | 1.0KΩ |
| V6 | 0.30mv. | C1 | 0.0056f |
| R1 | 1.0KΩ | C2 | 0.1μf |
| R2 | 0.5KΩ | C3 | 750pf. |
| R3 | 10Ω | C4 | 0.0047f |
| R4 | 18Ω | C5 | 300pf |
| R5 | 4.7KΩ | C6 | 0.0022f |
| R6 | 3.3KΩ | C7 | 0.001f |
| R7 | 1.0KΩ | C8 | 0.022f |
| R8 | 10KΩ | | |

Although the present intention has been described with reference to a presently preferred embodiment, it will be appreciated by those skilled in the art that various modifications, substitutions, etc. may be made without departing from the spirit and scope of the invention as defined by the following claims.

What is claimed is:

1. A phase-sensitive transducer apparatus comprising:
   first and second relatively movable members, said first relatively movable member having a plurality of windings and said second relatively movable member having a winding;
   means for applying a first input signal to one of the windings of said first relatively movable member and a second input signal to another of the windings of said first relatively movable member, an output signal being developed on the winding of said second relatively movable member, said first and second input signals being sinusoidal in nature of substantially identical frequency and peak amplitude and being phase-displaced by a predetermined amount, and said output signal being substantially constant in peak amplitude and variable in phase during relative movement of said first and second relatively movable members;
   means coupled to the winding of said second relatively movable member for squaring said output signal;
   means coupled to said means for squaring for demodulating said squared output signal to derive a pulse signal of constant peak amplitude and variable pulse width as said first and second relatively movable members are moved relative to one another;
   means coupled to said means for demodulating for integrating said pulse signal to derive a position signal indicative of the relative movement of said first and second relatively rotatable members, said position signal alternating during such relative movement between a peak voltage and a reference voltage; and means coupled to said means for integrating for offsetting said position signal so that it is substantially balanced about said reference voltage.

2. The apparatus of claim 1, further comprising:
a source of supply voltage; and
first means for coupling said supply voltage to the output of said means for demodulating whereby said peak amplitude of said pulse signal is maintained substantially constant at said supply voltage.

3. The apparatus of claim 2, wherein said means for offsetting comprises:
means coupled to said means for integrating for amplifying said position signal; and
second means for coupling said supply voltage to said means for amplifying whereby the output from said means for amplifying will be at said reference voltage when the position signal input to said means for amplifying is at a level equal to a predetermined fraction of said supply voltage.

4. The apparatus of claim 3, wherein said means for amplifying includes an operational amplifier having a first input coupled to said means for integrating for receiving the position signal as derived by said means for integrating, and a second input coupled by said second means for coupling to said supply voltage, wherein said predetermined fraction is one-half.

5. The apparatus of claim 4, wherein said first and second means for coupling each include a resistor.

6. A phase-sensitive transducer apparatus comprising:
first and second relatively movable members, said first relatively movable member having a plurality of windings and said second relatively movable member having a winding;
means for applying a first input signal to one of the windings of said first relatively movable member and a second input signal to another of the windings of said first relatively movable member, an output signal being developed on the winding of said second relatively movable members, said first and second input signals being sinusoidal in nature of substantially identical frequency and peak amplitude and being phase-displaced by a predetermined amount, and said output signal being substantially constant in peak amplitude and variable in phase during relative movement of said first and second relatively movable members;
means coupled to the winding of said second relatively movable member for squaring said output signal;
means coupled to said means for squaring and responsive to said squared output signal for generating a pulse signal of constant peak amplitude and variable pulse width as said first and second relatively movable members are moved relative to one another;
means coupled to said means for generating for deriving a position signal from said pulse signal, said position signal being indicative of the relative movement of said first and second relatively rotatable members and alternating during such relative movement between a peak voltage and a reference voltage; and
means coupled to said means for deriving for offsetting said position signal so that it is substantially balanced about said reference voltage.

* * * * *